United States Patent
Kosik et al.

[19]

[11] Patent Number: 6,077,189
[45] Date of Patent: Jun. 20, 2000

[54] AUTOMATIC CLUTCH WITH VERY SLOW SPEED

[75] Inventors: Franz Kosik, Ostfildern; Thomas Grass, Urbach, both of Germany

[73] Assignee: DaimlerChrysler AG, Stuttgart, Germany

[21] Appl. No.: 09/147,943

[22] PCT Filed: Aug. 13, 1997

[86] PCT No.: PCT/DE97/01793

§ 371 Date: Mar. 24, 1999

§ 102(e) Date: Mar. 24, 1999

[87] PCT Pub. No.: WO98/13621

PCT Pub. Date: Apr. 2, 1998

[30] Foreign Application Priority Data

Sep. 25, 1996 [DE] Germany .................. 196 39 293

[51] Int. Cl.[7] ............................. B60K 41/28; B60K 41/02
[52] U.S. Cl. ............................................. 477/74; 192/3.63
[58] Field of Search .................... 477/74, 171; 192/3.63, 192/218

[56] References Cited

U.S. PATENT DOCUMENTS

| 4,804,074 | 2/1989 | Kori ........................................... 477/74 |
|---|---|---|
| 4,838,397 | 6/1989 | Kurihara et al. ....................... 477/74 X |
| 5,067,599 | 11/1991 | Röder et al. . |
| 5,176,234 | 1/1993 | Reik et al. . |
| 5,314,050 | 5/1994 | Slicker et al. ........................... 477/171 |
| 5,609,543 | 3/1997 | Aoki et al. ............................. 477/74 X |
| 5,632,706 | 5/1997 | Kremmling et al. ..................... 477/74 |
| 5,941,792 | 8/1999 | Amendt et al. ........................... 477/74 |
| 5,964,680 | 10/1999 | Salecker et al. .......................... 477/74 |

FOREIGN PATENT DOCUMENTS

| 0375162 A2 | 6/1990 | European Pat. Off. . |
|---|---|---|
| 0536932 A2 | 4/1993 | European Pat. Off. . |
| 0375162 B1 | 1/1995 | European Pat. Off. . |
| 0731294 A2 | 9/1996 | European Pat. Off. . |
| 3306519 A1 | 9/1983 | Germany . |

Primary Examiner—Rodney H. Bonck
Attorney, Agent, or Firm—Evenson, McKeown, Edwards & Lenahan, P.L.L.C.

[57] ABSTRACT

Disclosed is an automatic clutch intended for use in an engine-transmission unit of a vehicle. When starting up, the clutch transmits first a high torque for a very slow speed, which is then reduced after a set lapse of time if a threshold value is exceeded.

17 Claims, 1 Drawing Sheet

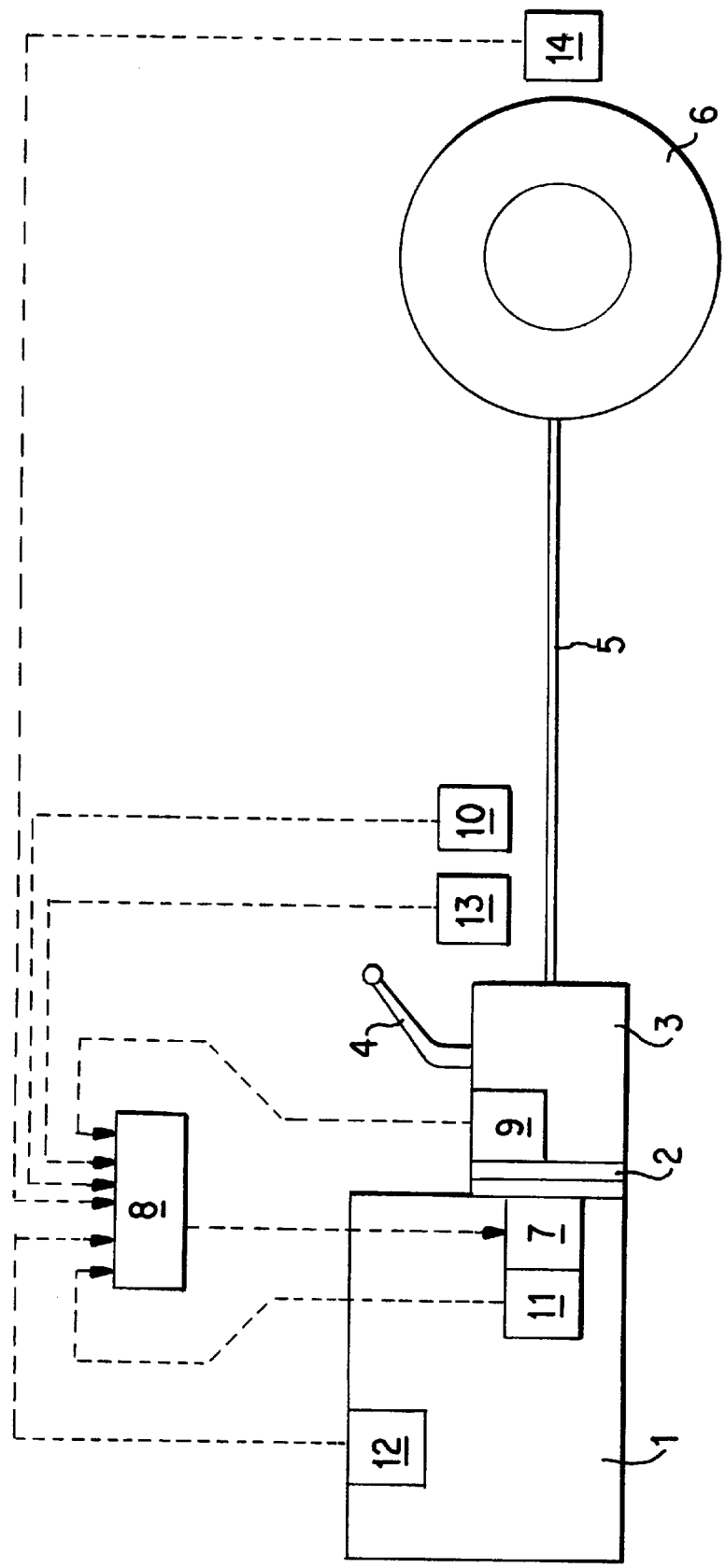

AUTOMATIC CLUTCH WITH VERY SLOW SPEED

BACKGROUND OF THE INVENTION

The present invention concerns an automatic control of a clutch in the drive train of a motor vehicle, having a transmission shifted by the driver between different transmission stages or gears and an engine controlled by the driver by means of a control element, for example a gas pedal. The clutch is automatically set by a motorized adjusting unit, actuated by the control, to a creeping torque at low travelling speed or when the vehicle is stationary and the transmission stage has been selected, the brake is unactuated and the control element is not actuated.

In motor vehicles with customary internal combustion engines, a transmission must be arranged in the drive train to allow the transmission ratio between the speed of the vehicle engine and the speed of the drive wheels to be changed according to the respective travelling speed and loading of the vehicle. In customary manually shifted transmissions, during the change of a transmission stage the power flow between engine and drive wheels has to be interrupted by releasing the clutch.

When starting the vehicle, the clutch must operate with slip, since the aforementioned transmission is not able to operate steplessly and conventional vehicle engines, in particular internal combustion engines, can only operate and deliver adequate power above a minimum speed.

It is known in principle to use automatic clutches for this purpose so that a clutch is automatically released when changing a transmission stage and is subsequently re-engaged. In starting situations, the clutch initially transmits only a limited torque, i.e. the creeping torque, which is adequate for making the vehicle start to slowly creep forward under normal driving conditions. If the vehicle is then accelerated by corresponding actuation of the gas pedal, the torque which can be transmitted by the clutch increases, so that, depending on the respective operating parameters, at a varying level of engine speed the clutch can transmit a torque which is above the engine torque.

It is known from EP 03 75 162 B1 to allow the automatic control of the clutch also to operate in dependence on the brake actuation in a creeping phase of the vehicle.

SUMMARY OF THE INVENTION

The object of the invention is thus to optimize the control of the clutch in the creeping phase.

This object is achieved according to the invention by initially setting a high creeping torque, at low travelling speed or when the vehicle is stationary, the transmission stage has been selected, the brake is unactuated and the control element is not actuated. The high creeping torque is automatically reduced after a predetermined time period if the brake continues to be unactuated and the gas pedal is not actuated.

In particular, the relatively high creeping torque can be initially set during starting, even after ending a brake actuation.

The invention is based on the general idea of controlling the clutch at the beginning of a starting situation, i.e. after selecting a transmission stage and ending a brake actuation and with the gas pedal not actuated, initially to deliver a relatively high creeping torque, in order to ensure that the vehicle can start reliably and comparatively rapidly. Should the gas pedal continue to remain unactuated within the predetermined time period, this is an indication that this is not a "normal" starting situation and the torque effective for driving the vehicle should be reduced. This at the same time protects the clutch against excessive wear. This applies in particular if the driver should hold a stationary or virtually stationary vehicle on an incline just by using the creeping torque of the clutch.

According to a preferred embodiment of the invention, the reduction in the creeping torque may be relinquished if a threshhold value for the travelling speed has been exceeded. This is because a higher travelling speed often indicates that a starting phase is unlikely to be terminated by the driver. Furthermore, it is ensured on inclines that the engine can, if required, have a braking effect even at relatively low travelling speed.

In addition or alternatively, it may be envisaged to monitor the difference in speed between the input and output of the clutch and not to reduce the creeping torque if the input and output of the clutch have reached speeds which are approaching one another or the same as one another. It is virtually inevitable that such rotational speed conditions have the consequence that the vehicle is running at a higher travelling speed, since an automatic electronic engine control customary in modern engines ensures virtually always that the engine, and consequently the clutch input, rotate at a minimum speed.

Otherwise, with regard to preferred features of the invention, reference is made to the claims and the following explanation of the drawing, on the basis of which a particularly preferred embodiment of the invention is described.

BRIEF DESCRIPTION OF THE DRAWING

In the drawing, the single Figure shows a schematized representation of a drive train of a motor vehicle as well as the components essential for the clutch control.

DESCRIPTION OF THE PREFERRED EMBODIMENT

An internal combustion engine 1 is connected in drive terms via an automatically actuated clutch 2 with a transmission 3, the transmission stages or gears of which are changed by manual actuation of a shift lever 4, and a drive shaft 5, for example a cardan shaft, to drive wheels 6 of a motor vehicle, otherwise not represented in any more detail.

The actuation of the clutch 2 takes place automatically by means of a motorized adjusting unit 7, which is actuated by a control circuit 8. The control circuit 8 takes into account a variety of parameters and is connected for this purpose to an extensive system of sensors.

The system of sensors comprises a sensor arrangement 9, which is assigned to the transmission 3 or the shift lever 4 and senses the positions and/or movements of the latter and consequently registers the respectively selected transmission stage or the respectively selected gear. The position of an element serving for controlling the power of the engine 1, for example a gas pedal actuated by the driver, is registered by a sensor 10. A displacement pickup 11 senses the travel of the adjusting unit 7 and consequently a parameter which is analogous to the value of the torque which can be transmitted by the automatic clutch 2. Furthermore, the control circuit 8 is connected to an engine control 12, the signals of which reproduce, inter alia, the speed of the engine, the torque of the engine 1 and an actuation of a control element for the power of the engine 1, for example the actuation of a gas pedal by the driver. A signalling device 13 registers whether a service brake of the vehicle is actuated. This signalling device 13 may be, for example, a brake light switch, by means of which the brake lights are controlled when the service brake is actuated. The wheel speeds, and consequently the travelling speed of the vehicle, are sensed by means of speed pickups 14, which are assigned to the vehicle wheels. These speed pickups 14 often also have the function of providing the necessary information on the turning of the wheels for an anti-lock braking system.

On the basis of the exchange of information with the engine control 12, the control circuit 8 can determine the torque transmitted in each case by the clutch 2 in dependence on the position of the adjusting unit 7. At constant travelling speed, the following applies for the torque $M_K$ transmitted by the clutch 2:

$$M_K = M_{mot} - J_{mot}\, dw_{Mot}/dt.$$

where $M_{mot}$ is the torque generated by the engine 1, which is detected by the engine control 12, $J_{mot}$ is the moment of inertia of the engine 1, which is predetermined by the design of the engine 1, and $w_{Mot}$ is the speed of the engine 1. t denotes time.

Since all engine-related variables can be sensed by the engine control 12 and it can be detected from the signals of the speed pickups 14 whether the vehicle is travelling at approximately constant speed, the control circuit 8 can often "detect" on the basis of its interaction with the engine control 12 and the speed pickups 14 the respective clutch torque $M_K$. In addition, the control circuit 8 knows from the signals of the displacement pickup 11 the position of the adjusting unit 7, so that the control circuit 8 can also often determine or update the proportionality between the clutch torque $M_K$ and the travel of the adjusting unit 7. As a result, the control circuit 8 thus "knows" the transmissible torque respectively set at the clutch 2.

In a starting situation, i.e. when the vehicle is stationary or at very low travelling speed, with an unactuated vehicle brake and the gas pedal or the like not actuated, the control circuit 8 initially sets the adjusting unit 7 such that the clutch 2 transmits a comparatively high creeping torque and the vehicle has a pronounced creeping tendency. If the gas pedal continues not to be actuated and the vehicle brake is unactuated, this state is maintained only for a predetermined limited time period, for example a few seconds. Thereafter, the torque which can be transmitted by the clutch 2 is reduced, thereby also reducing the tendency of the vehicle to creep.

Should the vehicle brake then be actuated, on ending of the brake actuation and with an unactuated gas pedal and the transmission stage selected, initially the high creeping torque can in turn be set and then reduced again, if appropriate, after the aforementioned time period.

Should the vehicle exceed a threshold value for the travelling speed during the time period with the high creeping torque, a reduction in the creeping torque may be relinquished.

We claim:

1. An automatic control of a clutch in the drive train of a motor vehicle comprising a transmission shifted by a driver between different transmission stages or gears and an engine controlled by the driver by a control element, the clutch being automatically set by a motorized adjusting unit, actuated by the control, to a creeping torque at low travelling speed or when the vehicle is stationary and the transmission stage has been selected, a brake is unactuated and the control element is not actuated, wherein a high creeping torque is initially set, at low travelling speed or when the vehicle is stationary, the drive position has been selected, the brake is unactuated and the control element is not actuated, the high creeping torque being automatically reduced after a predetermined time period when the brake continues to be unactuated and the control element is not actuated.

2. The control as claimed in claim 1, wherein, after brake actuation, the high creeping torque is once again initially set.

3. The control as claimed in claim 2, wherein the clutch is released on actuation of the brake if the travelling speed of the vehicle falls below a low threshold value.

4. The control as claimed in claim 3, wherein a reduction in the creeping torque is relinquished if a threshold value for the travelling speed is exceeded during the predetermined time period.

5. The control as claimed in claim 4, wherein the reduction in the creeping torque is relinquished if the input and output of the clutch have reached speeds which are approaching one another or the same as one another.

6. The control as claimed in claim 3, wherein a reduction in the creeping torque is relinquished if the input and output of the clutch have reached speeds which are approaching one another or the same as one another.

7. The control as claimed in claim 2, wherein a reduction in the creeping torque is relinquished if a threshold value for the travelling speed is exceeded during the predetermined time period.

8. The control as claimed in claim 7, wherein the reduction in the creeping torque is relinquished if the input and output of the clutch have reached speeds which are approaching one another or the same as one another.

9. The control as claimed in claim 2, wherein a reduction in the creeping torque is relinquished if the input and output of the clutch have reached speeds which are approaching one another or the same as one another.

10. The control as claimed in claim 1, wherein a reduction in the creeping torque is relinquished if a threshold value for the travelling speed is exceeded during the predetermined time period.

11. The control as claimed in claim 10, wherein the reduction in the creeping torque is relinquished if the input and output of the clutch have reached speeds which are approaching one another or the same as one another.

12. The control as claimed in claim 1, wherein a reduction in the creeping torque is relinquished if the input and output of the clutch have reached speeds which are approaching one another or the same as one another.

13. An automatic control of a clutch in the drive train of a motor vehicle comprising a transmission shifted by a driver between different transmission stages or gears and an engine controlled by the driver by a control element, the clutch being automatically set by a motorized adjusting unit, actuated by the control, to a creeping torque at low travelling speed or when the vehicle is stationary and the transmission stage has been selected, a brake is unactuated and the control element is not actuated, wherein a relatively high creeping torque, envisaged for a normal starting situation and allowing the vehicle to start reliably and comparatively rapidly, is initially set, at low travelling speed or when the vehicle is stationary, the drive position has been selected, the brake is unactuated and the control element is not actuated, and, after a predetermined time period, when the brake continues to be unactuated and the control element is not actuated, is automatically reduced, with a corresponding reduction in a creeping tendency of the vehicle.

14. The control as claimed in claim 13, wherein, after brake actuation, the high creeping torque is once again initially set.

15. The control as claimed in claim 14, wherein the clutch is released on actuation of the brake if the travelling speed of the vehicle falls below a low threshold value.

16. The control as claimed in claim 13, wherein a reduction in the creeping torque is relinquished if a threshold value for the travelling speed is exceeded during the predetermined time period.

17. The control as claimed in claim 13, wherein a reduction in the creeping torque is relinquished if the input and output of the clutch have reached speeds which are approaching one another or the same as one another.

* * * * *